US009889947B1

(12) United States Patent
Liberman

(10) Patent No.: US 9,889,947 B1
(45) Date of Patent: Feb. 13, 2018

(54) SYSTEM AND METHOD FOR GENERATING AND DISPLAYING AN AIRCRAFT ORIENTATION CUE

(71) Applicant: HONEYWELL INTERNATIONAL INC., Morris Plains, NJ (US)

(72) Inventor: Aric Charles Liberman, Yuma, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/292,338

(22) Filed: Oct. 13, 2016

(51) Int. Cl.
*G01C 23/00* (2006.01)
*B64D 45/00* (2006.01)
*B64D 43/02* (2006.01)

(52) U.S. Cl.
CPC .............. *B64D 45/00* (2013.01); *B64D 43/02* (2013.01); *G01C 23/005* (2013.01)

(58) Field of Classification Search
CPC ........ B64D 45/00; B64D 43/02; G01C 23/00; G01C 23/005; G01D 7/02
USPC ........................................................ 340/975
See application file for complete search history.

(56) References Cited

U.S. PATENT DOCUMENTS

| 4,419,079 | A | * | 12/1983 | Georges | G01C 23/005 340/973 |
|---|---|---|---|---|---|
| 5,415,549 | A | | 5/1995 | Logg | |
| 6,317,059 | B1 | * | 11/2001 | Purpus | G01C 23/005 340/973 |
| 6,702,229 | B2 | | 3/2004 | Anderson et al. | |
| 7,053,796 | B1 | | 5/2006 | Barber | |
| 8,164,485 | B2 | | 4/2012 | Prinzel, III et al. | |
| 8,400,330 | B2 | | 3/2013 | He et al. | |
| 8,803,709 | B2 | * | 8/2014 | Schmidt | G01C 23/00 340/975 |
| 9,057,627 | B2 | * | 6/2015 | Shaw | G01C 23/00 |
| 9,193,473 | B2 | | 11/2015 | Barth et al. | |
| 9,221,552 | B2 | | 12/2015 | Conner et al. | |
| 9,233,761 | B2 | | 1/2016 | Yamasaki | |
| 2015/0362332 | A1 | | 12/2015 | Vernaleken et al. | |

* cited by examiner

*Primary Examiner* — John A Tweel, Jr.
(74) *Attorney, Agent, or Firm* — Lorenz & Kopf, LLP

(57) ABSTRACT

An improved aircraft display system and method that generates an aircraft orientation cue are provided. The aircraft orientation cue may be displayed in a variety of panoramic and landscape displays, and on head up and on head down display. The aircraft orientation cue has a symbolic form sufficient to visually convey, simultaneously, and in a predetermined manner, each of the AOA, roll, and yaw of the ownship A/C.

20 Claims, 8 Drawing Sheets

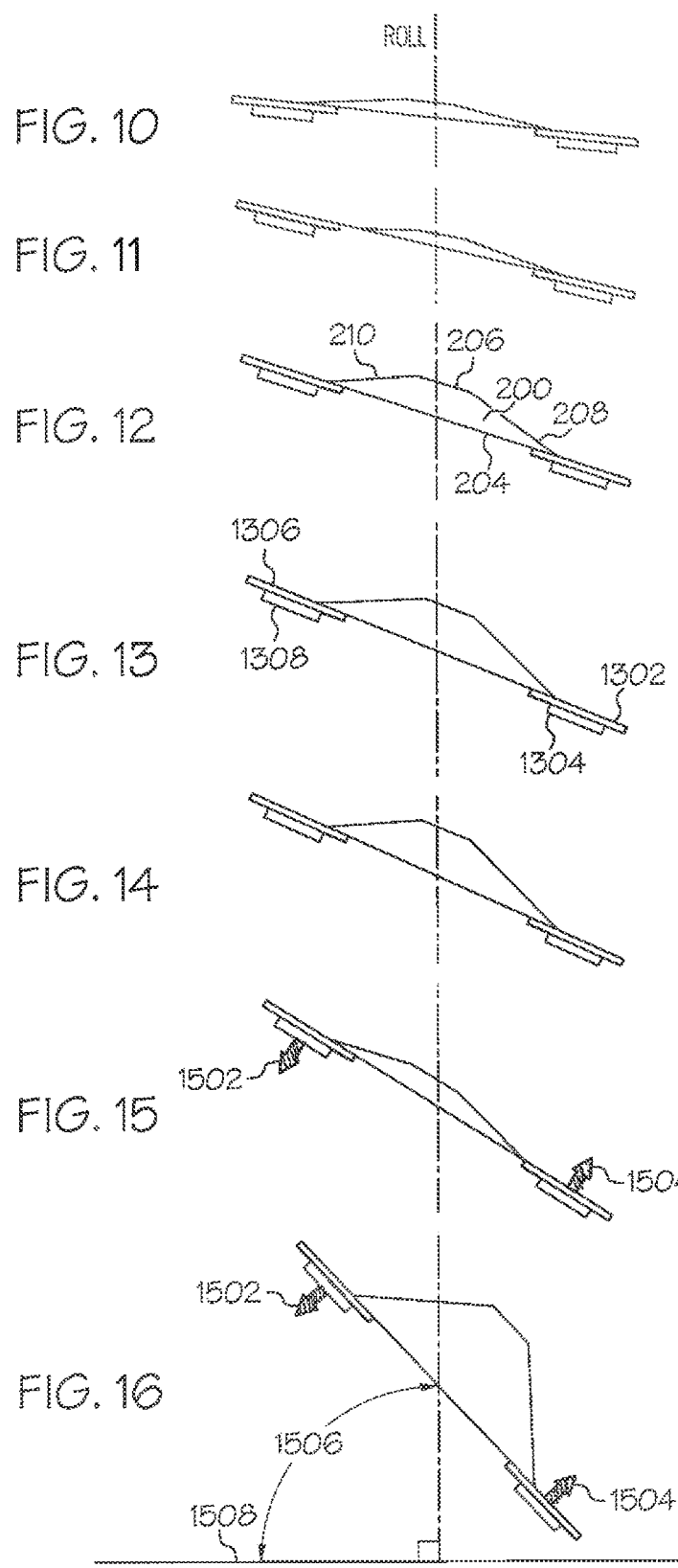

SYSTEM AND METHOD FOR GENERATING AND DISPLAYING AN AIRCRAFT ORIENTATION CUE

TECHNICAL FIELD

The present invention generally relates to aircraft display systems and methods, and more particularly relates to aircraft display systems and methods for generating and displaying an aircraft orientation cue.

BACKGROUND

With or without visual identification of a landing site, pilots increasingly rely on information presented on aircraft display systems while landing. Aircraft display systems may have head up displays and/or head down displays. Head up displays are designed to help with the transition from instrument flying to a visual landing segment, but generally do not provide all of the information required for a zero-zero (limited or no visibility) landing. In contrast, many aircraft head-down displays provide a visual segment to landing, in support of zero-zero landing, but limit the ability to use the displayed information for actual aircraft control inputs all the way to landing.

Landing generally requires an awareness of roll, pitch, and yaw, as well as of a potential stall. These pieces of information are generally provided in varying locations around an image on an aircraft display, in different formats, and not integrated with each other. For example, there is often a turn and slip indicator for yaw (the turn and slip indicator may appear as a bubble), a caged flight path and true flight path indicator from which to deduce a pitch angle and an angle of attack (AOA), and roll may be displayed as an arc showing an angle of bank. Staying situationally aware requires keeping an eye on these disparate regions on the display, and mentally integrating the information, which may be cognitively demanding. Adding to that, any loss in situational awareness during landing can dramatically increase cognitive demand.

Hence, an improved aircraft display system and method that integrates AOA, roll, and yaw information and may be used during a zero-zero landing is desirable. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A display system for use onboard an aircraft is provided. The display system comprises: a sensor system, configured to detect external conditions; a source of aircraft state data; a display device configured to display images using display techniques including (i) synthetic vision, (ii) enhanced vision, (iii) combined vision, and (iv) compressed attitude; and a processor, communicatively coupled to the sensor system, the source of aircraft state data, and the display device, the processor configured to process the external conditions and aircraft state data to: dynamically determine a current roll, a current yaw, a current angle of attack (AOA), and a current flight path; generate an aircraft orientation cue, the aircraft orientation cue defined by a top, a bottom, a first side and a second side, the top and bottom being parallel, and wherein a length of the first side, a length of the second side, and an orientation of the aircraft orientation cue is dynamically modified responsive to a combination of the current roll, the current yaw, and the current angle of attack (AOA); select a display technique for the display device; command the display device to dynamically display, in the selected display technique, a representation of a current external environment, overlaid with (a) flight path symbology indicating the current flight path, and (b) the aircraft orientation cue at a current location of the aircraft.

Another display system for use onboard an aircraft is provided. The display system comprising: a sensor system, configured to detect external conditions; and a processor, communicatively coupled to the sensor system and a source of aircraft state data, the processor configured to process the external conditions and aircraft state data to: dynamically determine, based on the external conditions and the aircraft state data, a current roll, a current yaw, a current angle of attack (AOA), and a current flight path; generate an aircraft orientation cue having a symbolic form sufficient to visually convey, simultaneously, and in a predetermined manner, each of: current roll, current AOA, and current yaw; and command a display device to dynamically display, a current external environment, overlaid with (a) flight path symbology indicating the current flight path, and (b) the aircraft orientation cue at a current location of the aircraft.

Also provided is a method for presenting information on a display system for use onboard an aircraft, the method comprising: detecting, by a sensor system, external conditions; receiving, from a source of aircraft state data, aircraft state data; and at a processor, processing external conditions and aircraft state data; dynamically determining, based on the external conditions and the aircraft state data, a current roll, a current yaw, a current angle of attack (AOA), and a current flight path; generating an aircraft orientation cue, the aircraft orientation cue defined by a top, a bottom, a first side and a second side, the top and bottom being parallel, and wherein a length of the first side, a length of the second side, and an orientation of the aircraft orientation cue is dynamically modified responsive to a combination of the current roll, the current yaw, and the current angle of attack (AOA); commanding a display device to dynamically display a representation of a current external environment, overlaid with: (a) flight path symbology indicating the current flight path, and (b) the aircraft orientation cue at a current location of the aircraft.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIGS. 10-16 depict various examples of how the aircraft orientation cue of FIG. 2 may be rendered to indicate roll conditions, in accordance with various embodiments;

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, brief summary, or the following detailed description.

Figure 1:
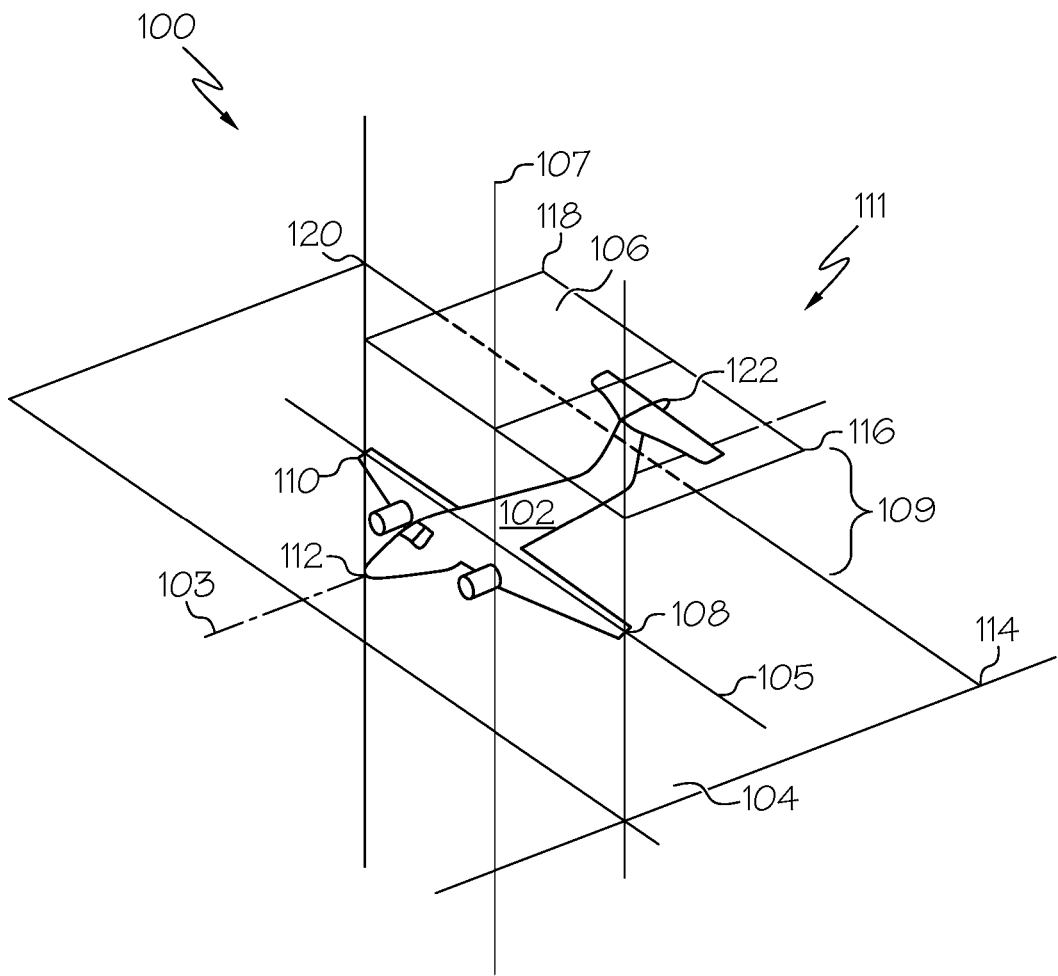
FIG. 1 and FIG. 2 are illustrations showing parallel planes around the ownship aircraft that are utilized in generating an aircraft orientation cue, in accordance with various embodiments.

Referring to FIG. 1, a method for generating an aircraft orientation cue is illustrated. Illustration 100 shows a first plane 104 through an ownship aircraft (A/C) 102 body, and a second plane 106 above the first plane 104. Ownship A/C 102 has a roll axis (longitudinal axis 103), pitch axis 105, and yaw axis 107 that intersect at a center of gravity of the ownship A/C 102. The first plane 104 horizontally bisects the ownship A/C 102. In the embodiment of FIG. 1, ownship A/C 102 has a left wing terminus 108, right wing terminus 110, and nose terminus 112, each defining the first plane 104. A tail terminus 122 extends from ownship A/C 102 and is within the second plane 106. In the provided embodiment, the second plane 106 is parallel to the first plane 104, at a predetermined height 109 above the first plane 104. However, it is contemplated that some embodiments may angle the second plane 106.

Viewing the ownship A/C 102 aft to fore (depicted by arrow 111), and with reference to FIG. 2, a polygon 200, is generated as follows. First plane 104 corner 114 is connected to second plane 106 corner 116, creating a first side 210. First plane 104 corner 120 is connected to second plane 106 corner 118, creating a second side 208. A top 206 is parallel to a bottom 204. Polygon 200 has centroid 202.

Polygon 200 is a symbolic form utilized herein as the aircraft orientation cue. The aircraft orientation cue is displayed on the display device 18, generally rendered or overlaid on a landscape or panoramic scene of the external environment. Pitch angle is a nose 112 up or down about pitch axis 105 with respect to a horizontal axis, and AOA is an angle between a longitudinal axis 103 of the ownship A/C 102 and the trajectory of the ownship A/C, or the flight path. As will be described in further detail below, the symbolic form is sufficient to visually convey, simultaneously, and in a predetermined manner, each of the AOA, roll, and yaw of the ownship A/C. Accordingly, the dimensions of the polygon 200 vary predictably to visually indicate the AOA, roll, and yaw of the ownship A/C. As will be described in more detail in connection with FIG. 23, the processor 12 is configured to continuously process received data and information to determine or identify a current pitch, a current angle of attack (AOA), a current roll, and a current yaw for the ownship A/C 102, and to generate and dynamically modify the aircraft orientation cue (polygon 200) therefrom.

FIGS. 3-21 are illustrations that show, for the provided embodiment, how the dimensions and orientation of the aircraft orientation cue (polygon 200) are modified to visually indicate the ownship A/C AOA, roll, and yaw. With respect to the provided embodiment, "polygon 200" and "aircraft orientation cue" may be used interchangeably, however, one with skill in the art will readily appreciate that symbolic forms other than a polygon may be utilized for an aircraft orientation cue without deviating from the scope of the invention.

Figure 2:
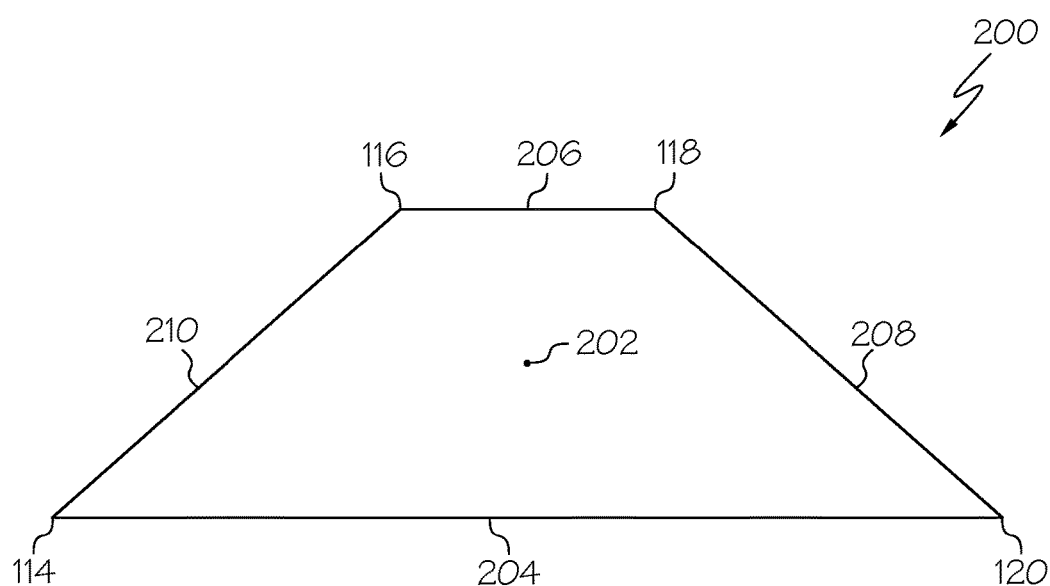
Figure 3:
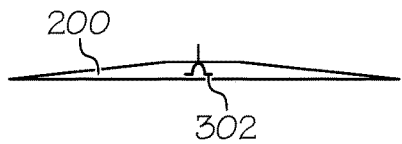
FIGS. 3-9 depict various examples of how the aircraft orientation cue of FIG. 2 may be rendered to indicate angles of attack, in accordance with various embodiments.
Figure 4:
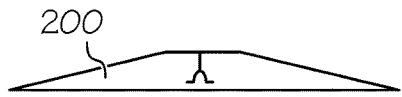
Figure 5:
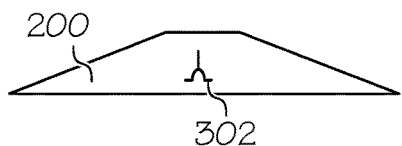
Figure 6:
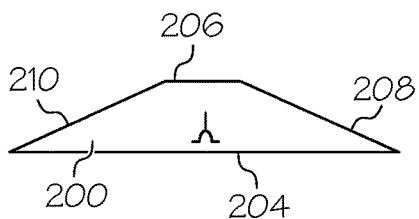
Figure 7:
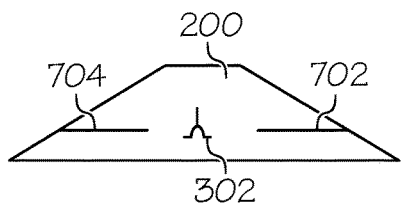
Figure 8:
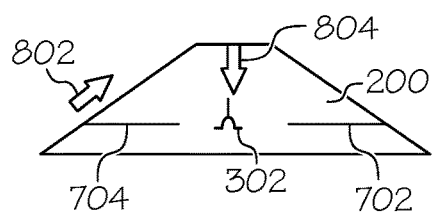
Figure 9:
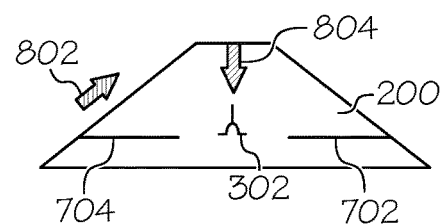

Turning to FIGS. 3-9, and with continuing reference to FIG. 1 and FIG. 2, the aircraft orientation cue, polygon 200, is shown depicting various angles of attack (AOA). In various embodiments, a flight path marker 302 and one or more lateral indicators 702 are also displayed with polygon 200. As indicated in FIGS. 3-9, the AOA is represented by a vertical size change in the polygon 200. The top 206 remains parallel to the bottom 204, while a first side 210 length (from corner 114 to corner 116) and a second side 208 length (from corner 118 to corner 120) vary. Notably, while the lengths vary from larger to smaller, the first side 210 and second side 208 track each other, having equal lengths in FIGS. 3-9. In other words, when only the AOA changes, the polygon 200 varies from being more squat (FIG. 3, showing a faster ownship A/C speed and low AOA) to taller (FIG. 9, showing a slower ownship A/C speed and higher AOA), while the sides always have equal length.

Responsive to determined AOA, an impending stall may be determined, and corrective action may be recommended by the display system 10 (FIG. 23) by displaying one or more symbols associated with the aircraft orientation cue, polygon 200. For example, in FIG. 8, corrective action is recommended by displaying a first symbol 802, shown near the first side 210, extending toward the top 206, indicating a need to increase speed, and a second symbol 804, shown near the top 206 and extending downward, indicating a need to decrease the AOA. In FIG. 8, the first symbol 802 and second symbol 804 are rendered in a first color, such as amber, and may flash, indicating a caution corrective action. In FIG. 9, the corrective action again comprises the first symbol 802, shown near the first side 210, extending toward the top 206, indicating a need to increase speed, and the second symbol 804, shown near the top 206, extending downward, indicating a need to decrease the AOA. In FIG. 9, the corrective action is determined to be more urgent than in FIG. 8, and the first symbol 802 and the second symbol 804 are rendered in a second color, such as red, and may continue to flash, indicating a warning corrective action. Warning corrective actions may additionally generate commands for an audio device to emit an alarm and/or audio message.

In each of AOA, roll, and yaw, the display system 10 determines a caution corrective action based on a predetermined caution threshold, and a warning corrective action based on a predetermined warning threshold, wherein the predetermined caution threshold is not the same as the predetermined warning threshold. While the described embodiment employs amber and red, one with skill in the art will readily appreciate that other colors may be employed to distinguish a caution corrective action from a warning corrective action. In addition, non-color techniques, such as flashing, changing a boundary or a fill shade (of the polygon 200 or of the first symbol 802 and the second symbol 804), and the like, may be employed to distinguish a caution corrective action from a warning corrective action. In various embodiments, the display system 10 may additionally adjust the zoom setting on the display when a caution corrective action or warning corrective action is determined. Adjusting the zoom allows the display system 10 to draw the pilot's attention to a specific region in the external environment as the caution corrective action or warning corrective action is displayed. It is contemplated that the zoom feature could zoom out fully, providing a "global" perspective and full environmental orientation to re-synchronize the pilot with the landing scenario if and when the pilot lost situational awareness.

Turning to FIGS. 10-16, and with continuing reference to FIG. 1 and FIG. 2, the orientation of the aircraft orientation cue, polygon 200, is associated with (or reflective of) the determined roll angle 1506 (in each of FIGS. 10-16, roll angle 1506 is indicated with an angle between the bottom 204 and a horizontal plane 1508). The roll angle 1506 is a rotation about the ownship A/C centerline or longitudinal axis 103, and the polygon 200 may rotate around the centroid 202. Referencing FIGS. 10-16, note that the roll angle 1506 is combined with the previously described AOA. For example, FIG. 10 indicates a roll angle 1506 in addition to the AOA of FIG. 3; FIG. 11 indicates a roll angle 1506 in addition to the AOA of FIG. 4; and so on, through FIG. 16 and FIG. 9. As with the above depictions, the top 206 remains parallel to the bottom 204, and the AOA is depicted with concurrent changes in the first side 210 length (from 114 to 116) and the second side 208 length (from 118 to 120). Additional symbology for indicating landing gear status (1302, 1304, 1306, and 1308) may be associated with the aircraft orientation cue.

Memory 14 can be external to and operatively coupled to processor 12 or, instead, is integrated into processor 12. In one embodiment, processor 12 and memory 14 reside in an Application Specific Integrated Circuit ("ASIC"). Memory 14 may store data, such as various software or firmware, supporting operation of processor 12 and other components included in display system 10, such as graphics system 20, sensor system 24, and the source of aircraft state data 26. Additionally, memory 14 may store one or more onboard databases 16. Onboard databases 16 can include a navigational database, a terrain database, a weather database, a historical trend database, and/or a runway database, such as an Enhanced Ground Proximity Warning System ("EGPWS") runway database.

Figure 17:
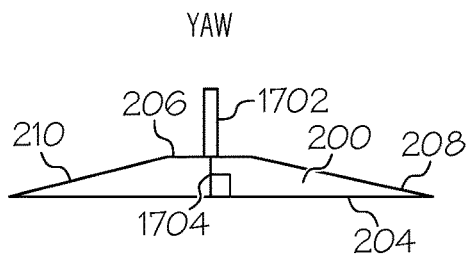
FIGS. 17-21 depict various examples of how an aircraft orientation cue of FIG. 2 may be rendered to indicate yaw conditions, in accordance with various embodiments.
Figure 18:
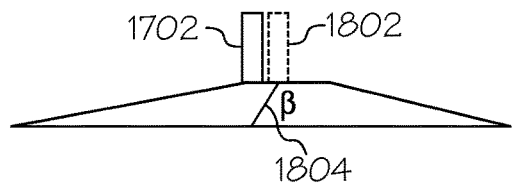
Figure 19:
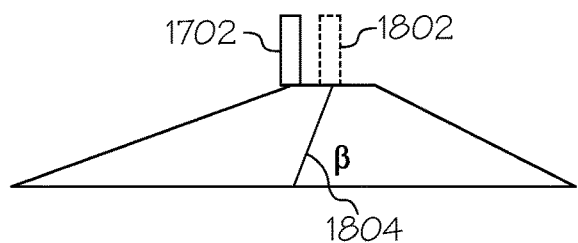

Turning next to FIGS. 17-21, and with continuing reference to FIG. 1 and FIG. 2, the aircraft orientation cue, polygon 200, is shown depicting various yaw angles (angle beta 1804). As with the above depictions, the top 206 remains parallel to the bottom 204. Yaw represents a nose left or nose right rotation about yaw axis 107. In FIGS. 17-21, a fifth and sixth symbol may be associated with the polygon 200 to indicate yaw corrective action, as follows. In FIGS. 17-21, fifth symbol 1702 is used to depict an ownship A/C tail when there is no yaw. In FIG. 17, the fifth symbol 1702 extends from the top 206 upward and is centered on the polygon 200. A straight line 1704 divides the bottom 204 in half evenly, and divides the top 206 in half evenly. When there is no yaw angle, the straight line 1704 is vertical; forming a ninety-degree angle with the bottom 204, and fifth symbol 1702 is centered on the top 206, serving as a yaw guide.

As a yaw angle is introduced, the polygon 200 distorts (defined as the first side 210 and second side 208 taking on uneven lengths), causing the straight line 1704 to deviate from vertical (but stay connected halfway through the bottom 204 and halfway through the top 206), thereby forming an angle beta 1804 measured from the bottom 204. In addition, a sixth symbol 1802, may be rendered in associated with the straight line 1704, the sixth symbol 1802 depicting an actual location of the ownship A/C tail with the determined yaw angle beta 1804. The fifth symbol 1702 (yaw guide) and sixth symbol 1802 together provide a visual indicator of a need for corrective action with respect to yaw. The fifth symbol 1702 (yaw guide) and sixth symbol 1802 may be rendered in different formats; in the depicted embodiment, the fifth symbol 1702 comprises a first shade or color and a solid boundary, and the sixth symbol 1802 comprises a second shade or color and a broken boundary. Wherein the first shade is not the same as the second shade, and the first color is not the same as the second color. In each of FIGS. 18-21, yaw is depicted by rendering straight line 1704 at various yaw angles beta 1804 measured from the bottom.

Figure 20:
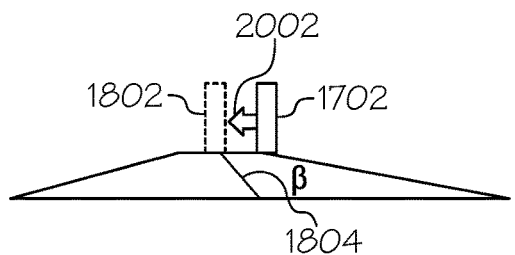
Figure 21:
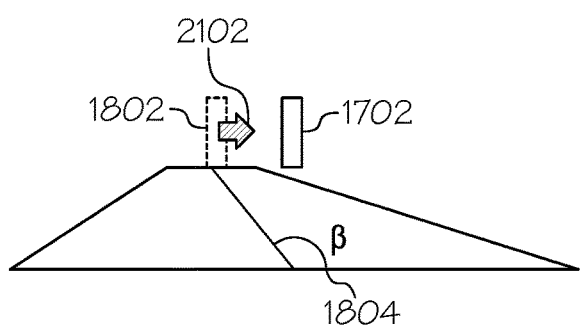

As with AOA and roll, responsive to determined yaw, corrective action may be recommended by the display system 10. In FIG. 20, corrective action is recommended by rendering symbology indicating a manner of bringing the yaw guide and the actual tail location (sixth symbol 1802) into alignment. To do so, the depicted embodiment displays a seventh symbol 2002 (an arrow pointing left), shown near the top 206 and yaw guide, fifth symbol 1702, indicating a need to correct by aligning the actual ownship A/C tail with the yaw guide. In FIG. 20, the seventh symbol 2002 is rendered in a first color, such as amber, to indicate a caution. In FIG. 21, the corrective action is depicted by an arrow pointing right (seventh symbol 2102), and the corrective action has become more urgent, wherein the seventh symbol 2102 is rendered in a second color, such as red, to indicate a warning. Regardless of the specific colors used, in each of the foregoing examples, the color employed for a caution and the color employed for a warning are different.

Figure 22:
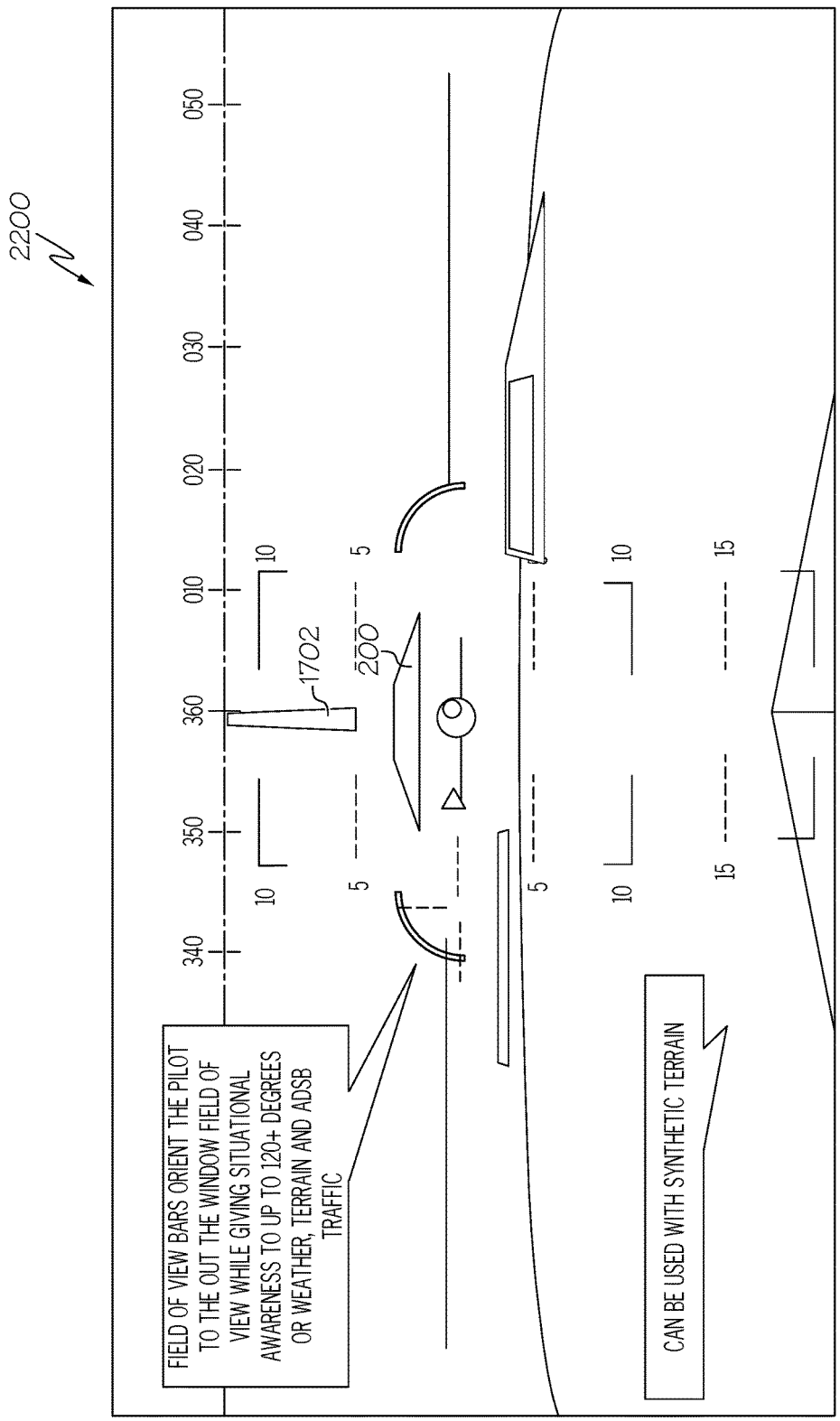
FIG. 22 depicts the aircraft orientation cue of FIG. 2 rendered on a landscape display, in accordance with various embodiments.

In the provided embodiment, the aircraft orientation cue, or polygon 200, is internally transparent, in order to be displayed or rendered as an overlay on a panoramic or landscape display. FIG. 22 depicts the polygon 200 overlaid on a panoramic or landscape display. In such cases, the generation of the panoramic or landscape display is provided using existing techniques and technologies, as described in connection with FIG. 23.

Figure 23:
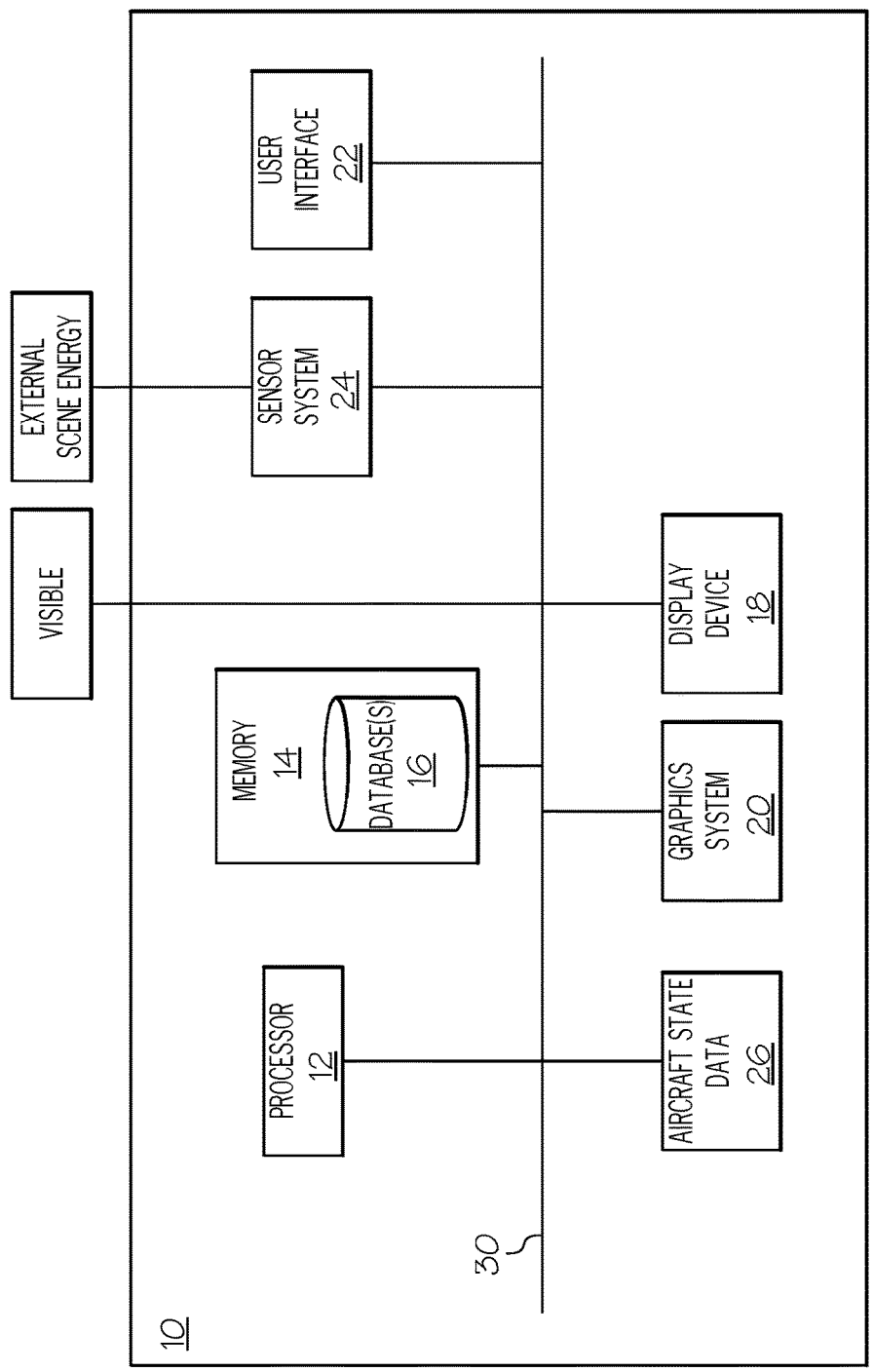
FIG. 23 depicts a functional block diagram of a display system that may be used for displaying an aircraft orientation cue, in accordance with various embodiments.

FIG. 23 sets-forth a functional block diagram of display system 10 suitable for determining and displaying an aircraft orientation cue algorithms, such as an algorithm performed by process 2400 described below in conjunction with FIG. 24. Display system 10 may include the following components, many or all of which may be integrated, or comprised of multiple devices, systems, or elements: (i) a processor 12; (ii) a memory 14; (iii) one or more display devices 18; (iv) a graphics system 20; (v) a user input interface 22; (vi) a sensor system 24; and (vii) a source of aircraft state data 26. The foregoing components of display system 10 are operatively coupled by an interconnection architecture 30 enabling the transmission of data, command signals, and operating power. Although display system 10 is schematically illustrated in FIG. 1 as a single unit, the individual elements and components of display system 10 can be implemented in a distributed manner using any number of physically distinct and operatively interconnected pieces of hardware or equipment.

Processor 12 may comprise, or be associated with, any suitable number of additional conventional electronic components including, but not limited to, various combinations of microprocessors, flight control computers, navigational equipment, memories, power supplies, storage devices, interface cards, and other standard components known in the art. Furthermore, processor 12 may include, or cooperate with, any number of software programs (e.g., avionic display programs) or instructions designed to carry out the various methods, process tasks, calculations, and control/display functions described below. During operation of display system 10, processor 12 continuously obtains and processes current external conditions and current aircraft state data indicative of the angle of attack (AOA), roll, pitch and yaw of the ownship A/C 102. Processor 12 utilizes the aforementioned data to generate an aircraft orientation cue (polygon 200) representative thereof. In certain embodiments, processor 12 may also present suggested corrective actions on display devices 18.

Memory 14 can be external to and operatively coupled to processor 12 or, instead, in integrated into processor 12. In one embodiment, processor 12 and memory 14 reside in an Application Specific Integrated Circuit ("ASIC"). Memory 14 may store data, such as various software or firmware, supporting operation of processor 12 and other components included in display system 10, such as graphics system 20, sensor system 24, and the source of aircraft state data 26. Additionally, memory 14 may store one or more onboard databases 16. Onboard databases 16 can include a navigational database, a terrain database, a weather database, a historical trend database, and/or a runway database, such as an Enhanced Ground Proximity Warning System ("EGPWS") runway database.

Processor 12 and graphics system 20 cooperate to display, render, or otherwise convey one or more graphical representations, synthetic displays, graphical icons, visual symbology, or images associated with operation of the ownship A/C 102 on display device(s) 18. An embodiment of display system 10 may utilize existing graphics processing techniques and technologies in conjunction with graphics system 20. Graphics system 20 is suitably configured to support well-known graphics technologies and display techniques including (i) synthetic vision, (ii) enhanced vision, (iii) combined vision, and (iv) compressed attitude.

Display device(s) 18 may comprise any image-generating device or devices capable of producing one or more navigation displays of the types described herein. As a point of emphasis, the term "display device" encompasses display devices (image-generating devices) fixed to the A/C cockpit, as well as Electronic Flight Bags ("EFBs") and other portable display devices that may be carried by a pilot into the cockpit of an A/C and perform the below-described functions. For example, the display device 18 may implement one or more of a multi-function display (MFD), a three-dimensional MFD, a primary flight display (PFD), a synthetic vision system (SVS) display, a vertical situation display (VSD), a horizontal situation indicator (HSI), a traffic awareness and avoidance system (TAAS) display, a three-dimensional TAAS display, just to name a few. Moreover, the display system 10 may be implemented with multiple display devices 18, each of which may implement one or more of these different, non-limiting displays.

No matter the number or particular type of display that is used to implement the display device 18, it was noted above that the display device 18 is responsive to the image rendering display commands it receives to render various images. The images that the display device 18 renders will depend, for example, on the type of display being implemented. One particular image that the display device 18 renders is depicted in FIG. 22.

With continued reference to FIG. 23, the source of aircraft state data 26 generates, measures, and/or provides different types of data related to the operational status of the ownship aircraft (A/C), the environment in which the ownship A/C is operating, flight parameters, and the like. The source of aircraft state data 26 may also include other systems or subsystems commonly deployed onboard A/C, such as a Flight Management System ("FMS"), an Inertial Reference System ("IRS"), and/or an Attitude Heading Reference System ("AHRS"). Data provided by source of aircraft state data 26 may include, without limitation: airspeed data; groundspeed data; altitude data; attitude data including pitch data and roll data; yaw data; geographic position data, such as Global Positioning System ("GPS") data; gross A/C weight; time/date information; heading information; atmospheric conditions; flight path data; track data; radar altitude; geometric altitude data; wind speed data; wind direction data; fuel consumption; and the like.

Display system 10 may also consider input data received via user input interface 22 when performing the below-described functions. In this regard, user input interface 22 can include any number and type of input devices suitable for receiving pilot input, which may be distributed throughout the cockpit of an A/C and possibly included in other systems or subsystems. In one embodiment, user input interface 22 assumes the form of or includes the alphanumeric keypad of an FMS.

The processor 12 is configured, upon receipt of data and information, continuously processes the information to identify the angle of attack (AOA), roll, pitch, and yaw for the ownship A/C 102, and to generate a symbolic form representative thereof. The symbolic form is an aircraft orientation cue to be displayed on the display device 18, and the dimensions of the symbolic form vary predictably to indicate, respectively, AOA, roll, and yaw. As described above, in the depicted embodiments, the symbolic form is the polygon 200; however, one with skill in the art will readily appreciate that other symbolic forms may be utilized for the aircraft orientation cue without deviating from the scope of the invention.

The sensor system 24 may comprise one or more sensor technologies, devices, instruments (such as on-board radar, radar altimeter, a global positioning system (GPS)), and software, sufficient for detecting and providing ownship A/C 102 status data (including speed, location, position, remaining fuel, faults, conditions, and detected weather and temperature).

Figure 24:
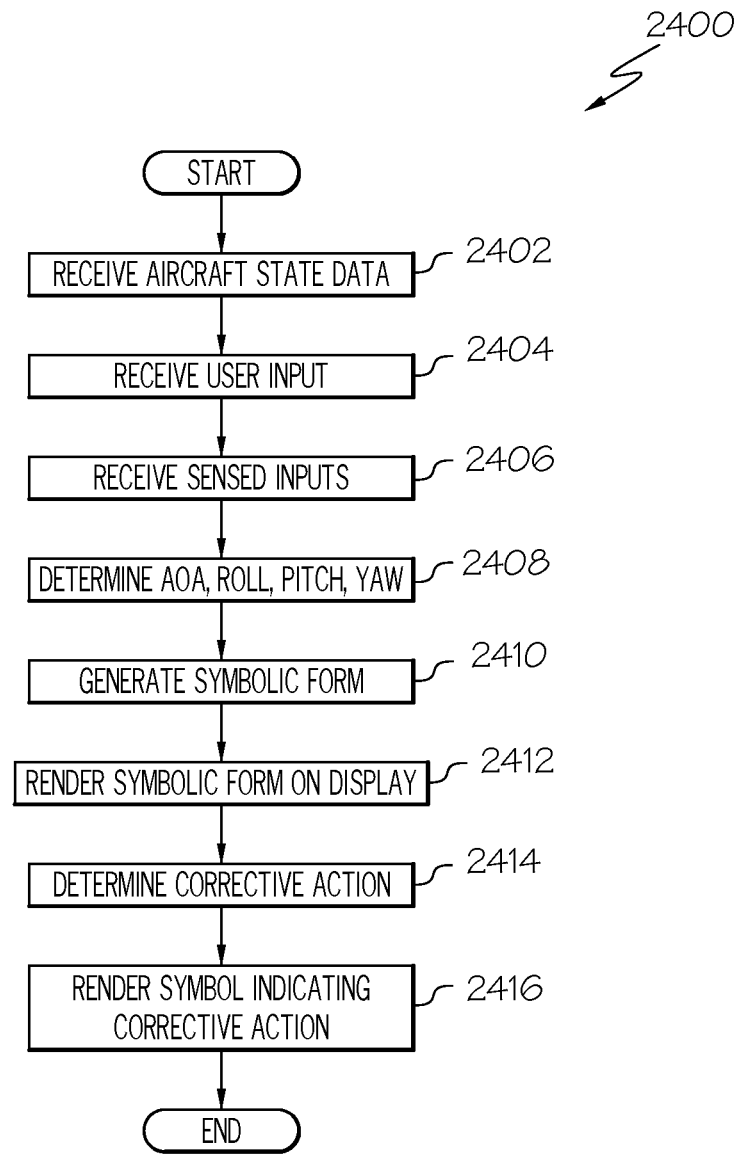
FIG. 24 is a flowchart depicting a process that may be implemented by the display system in FIG. 23, for displaying an aircraft orientation cue, in accordance with various embodiments.

Referring now to FIG. 24, a process that the display system 10 may implement is depicted in flowchart form. In the provided embodiment, the processor 12 performs process steps. As can be appreciated in light of the disclosure, the order of the process steps is not limited to the sequential execution illustrated in FIG. 24, rather the process steps may be performed in one or more varying orders as applicable, and in accordance with the present disclosure. As can further be appreciated, one or more steps of the process may be added or removed without altering the spirit of the process.

The process 2400 begins (at 2402) by processing aircraft state data. At 2404, relevant user input is received via the user input interface 22 and processed. User input may comprise default values for dimensions of the symbolic form, default colors for corrective actions, a corrective action caution threshold for respective corrective actions, a corrective action warning threshold for respective corrective actions, and the like. At 2406, sensed inputs are received from the sensor system 24 and processed. At 2408, an angle of attack (AOA), a roll, a pitch, and a yaw, for the ownship A/C are determined based on the received inputs. At 2410, the process 2400 generates a symbolic form having a shape and orientation, such as the polygon 200 described herein, to be the aircraft orientation cue. The symbolic form is sufficient to visually convey, simultaneously, and in a predetermined manner, each of roll, AOA, and yaw information. At 2412, the process 2400 renders the symbolic form on the display device 18. In various embodiments, the symbolic form is rendered as an overlay on a panoramic or landscape display, such as a synthetic vision display. At 2416, a corrective action is determined. Corrective action may comprise one or more of corrective action for AOA, corrective action for roll, and corrective action for yaw. At 2416, the process 2400 renders symbology associated with the symbolic form that indicates the corrective action.

In addition to the provided steps, the process 2400 may determine that a corrective action is no longer relevant, and remove, from the displayed external environment, the symbol indicating the corrective action upon determining that the corrective action is no longer relevant. Determining that a corrective action is relevant may comprise comparing the current external conditions and current aircraft state data with a predetermined caution threshold or a predetermined warning threshold. Each of AOA, roll, pitch and yaw may have their respective predetermined caution and warning thresholds. In some embodiments, a user may establish the predetermined caution or warning threshold by entering it via the user input interface 22.

Moreover, in some embodiments, a user may select, via the user input interface 22, the display technique prior to rendering the symbolic form on the display at 2412 above, and then the selected display technique is employed for rendering the symbolic form on the display at 2412. As mentioned above, display techniques may be selected from the set including (i) synthetic vision, (ii) enhanced vision, (iii) combined vision, and (iv) compressed attitude, and the like.

The system and method described herein improve upon existing aircraft display systems by generating an aircraft orientation cue that may be displayed in a variety of panoramic and landscape displays, and on head up and head down displays. The aircraft orientation cue is symbolic form sufficient to visually convey, simultaneously, and in a predetermined manner, each of the AOA, roll, and yaw of the ownship A/C.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A display system for use onboard an aircraft, the display system comprising:
   a sensor system, configured to detect external conditions;
   a source of aircraft state data;
   a display device configured to display images using display techniques including (i) synthetic vision, (ii) enhanced vision, (iii) combined vision, and (iv) compressed attitude; and
   a processor, communicatively coupled to the sensor system, the source of aircraft state data, and the display device, the processor configured to process the external conditions and aircraft state data to:
      dynamically determine a current roll, a current yaw, a current angle of attack (AOA), and a current flight path;
      generate an aircraft orientation cue, the aircraft orientation cue defined by a top, a bottom, a first side and a second side, the top and bottom being parallel, and wherein a length of the first side, a length of the second side, and an orientation of the aircraft orientation cue is dynamically modified responsive to a combination of the current roll, the current yaw, and the current angle of attack (AOA);
      select a display technique for the display device;
      command the display device to dynamically display, in the selected display technique, a representation of a current external environment, overlaid with
         (a) flight path symbology indicating the current flight path, and
         (b) the aircraft orientation cue at a current location of the aircraft.

2. The display system of claim 1, wherein the aircraft orientation cue comprises a polygon and the orientation of the polygon is associated with the current roll.

3. The display system of claim 2, wherein the processor is further configured to:
   determine an AOA corrective action associated with the current AOA; and
   display a first symbol and a second symbol indicating the AOA corrective action, such that the first symbol and second symbols are associated with the polygon on the display.

4. The display system of claim 3, wherein the processor is further configured to:
   determine a roll corrective action associated with the current roll; and
   display a third symbol and a fourth symbol indicating the roll corrective action, such that the third symbol and the fourth symbol are associated with the polygon on the display.

5. The display system of claim 4, wherein the processor is further configured to:
   determine a yaw corrective action associated with the current yaw; and
   overlay the displayed external environment with one or more of a fifth, sixth, and seventh symbols indicating the yaw corrective action.

6. The display system of claim 5, wherein the processor is further configured to remove from the displayed external environment a symbol indicating a corrective action upon determining that the corrective action is no longer relevant.

7. The display system of claim 6, wherein the sensor system comprises one or more of on-board radar, a radar altimeter, and a global positioning system (GPS).

8. The display system of claim 7, wherein the corrective action comprises an indication of one or more of: an impending stall, a need to depress a left pedal, and a need to depress a right pedal.

9. The display system of claim 8, wherein the corrective action comprises a caution threshold and a different warning threshold.

10. A display system for use onboard an aircraft, the display system comprising:
    a sensor system, configured to detect external conditions; and
    a processor, communicatively coupled to the sensor system and a source of aircraft state data, the processor configured to process the external conditions and aircraft state data to:
       dynamically determine, based on the external conditions and the aircraft state data, a current roll, a current yaw, a current angle of attack (AOA), and a current flight path;
       generate an aircraft orientation cue having a symbolic form sufficient to visually convey, simultaneously, and in a predetermined manner, each of: current roll, current AOA, and current yaw; and
       command a display device to dynamically display, a current external environment, overlaid with
          (a) flight path symbology indicating the current flight path, and
          (b) the aircraft orientation cue at a current location of the aircraft.

11. The display system of claim 10, wherein the aircraft orientation cue is a polygon and the orientation of the polygon is associated with the current roll.

12. The display system of claim 11, wherein the processor is further configured to:
    determine an AOA corrective action associated with the current AOA; and
    display a first symbol and a second symbol indicating the AOA corrective action, such that the first symbol and second symbols are associated with the polygon on the display.

13. The display system of claim 12, wherein the processor is further configured to:
    determine a roll corrective action associated with the current roll; and
    display a third symbol and a fourth symbol indicating the roll corrective action, such that the third symbol and the fourth symbol are associated with the polygon on the display.

14. The display system of claim 13, wherein the processor is further configured to:
    determine a yaw corrective action associated with the current yaw; and
    overlay the displayed external environment with one or more of a fifth, sixth, and seventh symbols indicating the yaw corrective action.

15. The display system of claim 14, wherein the processor is further configured to remove from the displayed external environment a symbol indicating a corrective action upon determining that the corrective action is no longer relevant.

16. The display system of claim 15, wherein the sensor system comprises one or more of on-board radar, a radar altimeter, and a global positioning system (GPS).

17. A method for presenting information on a display system for use onboard an aircraft, the method comprising:
   detecting, by a sensor system, external conditions;
   receiving, from a source of aircraft state data, aircraft state data; and
   at a processor,
      processing external conditions and aircraft state data;
      dynamically determining, based on the external conditions and the aircraft state data, a current roll, a current yaw, a current angle of attack (AOA), and a current flight path;
      generating an aircraft orientation cue, the aircraft orientation cue defined by a top, a bottom, a first side and a second side, the top and bottom being parallel, and wherein a length of the first side, a length of the second side, and an orientation of the aircraft orientation cue is dynamically modified responsive to a combination of the current roll, the current yaw, and the current angle of attack (AOA);
      commanding a display device to dynamically display a representation of a current external environment, overlaid with:
         (a) flight path symbology indicating the current flight path, and
         (b) the aircraft orientation cue at a current location of the aircraft.

18. The method of claim 17, wherein the aircraft orientation cue is a polygon and further comprising:
   determining a corrective action from the set including:
      an AOA corrective action associated with the current AOA,
      a roll corrective action associated with the current roll, and
      a yaw corrective action associated with the current yaw; and
   displaying a symbol indicating the corrective action, such that the symbol is associated with the polygon on the display.

19. The method of claim 18, further comprising:
   removing from the displayed external environment the symbol indicating the corrective action upon determining that the corrective action is no longer relevant.

20. The method of claim 19, wherein the corrective action comprises a caution threshold and a different warning threshold.

* * * * *